US011539246B1

(12) United States Patent
Wu

(10) Patent No.: US 11,539,246 B1
(45) Date of Patent: Dec. 27, 2022

(54) WIRELESS CHARGING SYSTEM AND OPERATING METHOD THEREOF

(71) Applicant: RICHTEK TECHNOLOGY CORP., Hsinchu County (TW)

(72) Inventor: Wei-Shuo Wu, Kaohsiung (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 17/667,553

(22) Filed: Feb. 9, 2022

Related U.S. Application Data

(60) Provisional application No. 63/241,003, filed on Sep. 6, 2021.

(30) Foreign Application Priority Data

Oct. 20, 2021 (TW) .................. 110138846

(51) Int. Cl.
*H02J 50/40* (2016.01)
*H02J 50/80* (2016.01)
*H02J 7/00* (2006.01)
*H02J 50/10* (2016.01)
*G08C 17/02* (2006.01)

(52) U.S. Cl.
CPC .......... *H02J 50/40* (2016.02); *H02J 7/00712* (2020.01); *H02J 50/10* (2016.02); *H02J 50/80* (2016.02); *G08C 17/02* (2013.01); *H02J 2207/20* (2020.01)

(58) Field of Classification Search
CPC .. H02J 50/40; H02J 50/80; H02J 50/10; H02J 7/00712; H02J 2207/20; G08C 17/02
USPC .......................................................... 307/104
See application file for complete search history.

(56) References Cited

U.S. PATENT DOCUMENTS

| 9,825,674 B1* | 11/2017 | Leabman ................ H02J 50/80 |
| 2016/0099613 A1* | 4/2016 | Bell ...................... H04B 1/3838 307/104 |
| 2016/0099757 A1* | 4/2016 | Leabman ................ H02J 50/20 307/104 |

* cited by examiner

*Primary Examiner* — Alfonso Perez Borroto
(74) *Attorney, Agent, or Firm* — Winston Hsu

(57) ABSTRACT

A wireless charging system includes a wireless power transmitter and N wireless power receivers. The wireless power transmitter includes a power input terminal for receiving an input power, and M transmission modules. Each transmission module includes a power controller, a power management unit, a bridge driver, and a transmission unit. The N wireless power receivers are for receiving N wireless power signals from N transmission units of N transmission modules respectively, and wirelessly transmitting the N communication signals to the N transmission units of the N transmission modules respectively. The M power management units of the M transmission modules are coupled to each other and transmit control signals for handshaking communication.

16 Claims, 7 Drawing Sheets

WIRELESS CHARGING SYSTEM AND OPERATING METHOD THEREOF

CROSS REFERENCE TO RELATED APPLICATIONS

This application claims the benefit of U.S. Provisional Application No. 63/241,003, filed on Sep. 6, 2021. The content of the application is incorporated herein by reference.

BACKGROUND OF THE INVENTION

1. Field of the Invention

The present invention is related to a wireless charging system and operating method, and more particularly to a controllable multi-terminal wireless charging system and operating method.

2. Description of the Prior Art

Wireless charging is a technology that realizes energy transmission between a power supply and an electrical device in a non-contact manner by using near-field induction. The energy received by the electrical device is used to charge the battery and supply its own operation at the same time. Since the energy is transmitted between the charger and the electrical device through inductive coupling, there is no need to use a cable to connect the two. The charger and the electrical device do not need to have exposed conductive contacts.

Wireless charging is widely used in electric vehicles, medical equipment, small household appliances and other devices. In daily life, a typical application of wireless charging is a mobile phone wireless charging system. The structure mainly includes a charging base and a charging adapter. The basic principle is that the transmitter converts electrical energy to an electromagnetic field and transmits it through the transmitting coils, and the receiving coil rectifies the received electromagnetic energy to supply power to the load (mobile phone) through electromagnetic induction. In order to control the charging process, data communication is also required between the transmitter and the receiver. The data communication between the transmitter and the receiver usually adopts a one-to-one communication method. In other words, a transmission channel is established through the electromagnetic coupling between the transmitting and the receiving coils for data transmission.

Wireless charging typically uses electromagnetic coupling to transmit signals. The performance of the communication system is affected by the coupling coefficient of the transmitting and the receiving coils. As the distance between the two coils or the center offset distance increases, the coupling coefficient decreases and the signal decays quickly. In order to maintain the stability of the signal, the transmitting and the receiving coils must be in a near-distant and static state. Therefore, when wirelessly charging a mobile load, the wireless charging system based on coil coupling communication may have the problem of unstable communication control. If there are multiple devices charging at the same time, the total power required by these devices may exceed the capacity of the transmitter and may cause the charging system to malfunction.

SUMMARY OF THE INVENTION

An embodiment provides a wireless charging system including a wireless power transmitter and N wireless power receivers. The wireless power transmitter includes a power input terminal for receiving an input power, and M transmission modules. Each transmission module includes a power controller, a power management unit, a bridge driver, and a transmission unit. The power controller is coupled to the power input terminal for converting the input power to a first DC (direct-current) signal according to a first voltage control signal. The power management unit is coupled to the power controller for generating the first voltage control signal according to N communication signals. The bridge driver is coupled to the power controller and the power management unit for converting the first DC signal to a first AC (alternating-current) signal and for transmitting a communication signal to the power management unit. The transmission unit is coupled to the bridge driver for wirelessly transmitting a wireless power signal according to the first AC signal, wirelessly receiving the communication signal, and transmitting the communication signal to the bridge driver. The N wireless power receivers are for receiving N wireless power signals from N transmission units of N transmission modules respectively, and wirelessly transmitting the N communication signals to the N transmission units of the N transmission modules respectively. The M power management units of the M transmission modules are coupled to each other and transmit control signals for handshaking communication. M≥N>1.

Another embodiment provides a wireless charging system including a wireless power transmitter and N wireless power receivers. The wireless power transmitter includes a power input terminal for receiving an input power, a power management unit, and M transmission modules. The power management unit is coupled to the power input terminal for generating N first voltage control signal according to N communication signals. Each transmission module includes a power controller, a bridge driver, and a transmission unit. The power controller is coupled to the power management unit for converting the input power to a first DC (direct-current) signal according to a first voltage control signal of N first voltage control signals. The bridge driver is coupled to the power controller and the power management unit for converting the first DC signal to a first AC (alternating-current) signal and for transmitting a communication signal to the power management unit. The transmission unit is coupled to the bridge driver for wirelessly transmitting a wireless power signal according to the first AC signal, wirelessly receiving the communication signal, and transmitting the communication signal to the bridge driver. The N wireless power receivers are for receiving N wireless power signals from N transmission units of N transmission modules respectively, and wirelessly transmitting the N communication signals to the N transmission units of the N transmission modules respectively. M≥N>1.

An embodiment provides an operating method for a wireless charging system. The wireless charging system includes a wireless power transmitter and N wireless power receivers. The wireless power transmitter includes a power input terminal and M transmission modules. Each transmission module includes a power controller, a power management unit, a bridge driver, and a transmission unit. The method includes when the power management unit receives a communication signal, M power management units of the M transmission modules transmitting M control signals for handshaking communication, the power management unit generating a first voltage control signal according to the communication signal, the power controller converting an input power to a first DC signal according to the first voltage control signal, the bridge driver converting the first DC signal to a first AC signal, the transmission unit wirelessly transmitting a wireless power signal according to the first AC signal, and the N wireless power receivers respectively receiving N wireless power signals from N transmission units of N transmission modules. M≥N>1.

Another embodiment provides an operating method for a wireless charging system. The wireless charging system includes a wireless power transmitter and N wireless power receivers. The wireless power transmitter includes a power input terminal, a power management unit, and M transmission modules. Each transmission module includes a power controller, a bridge driver, and a transmission unit. The method includes when the power management unit receives a communication signal, the power management unit generating a first voltage control signal according to the communication signal, the power controller converting an input power to a first DC signal according to the first voltage control signal, the bridge driver converting the first DC signal to a first AC signal, the transmission unit wirelessly transmitting a wireless power signal according to the first AC signal, and the N wireless power receivers respectively receiving N wireless power signals from N transmission units of N transmission modules. MN≥1.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
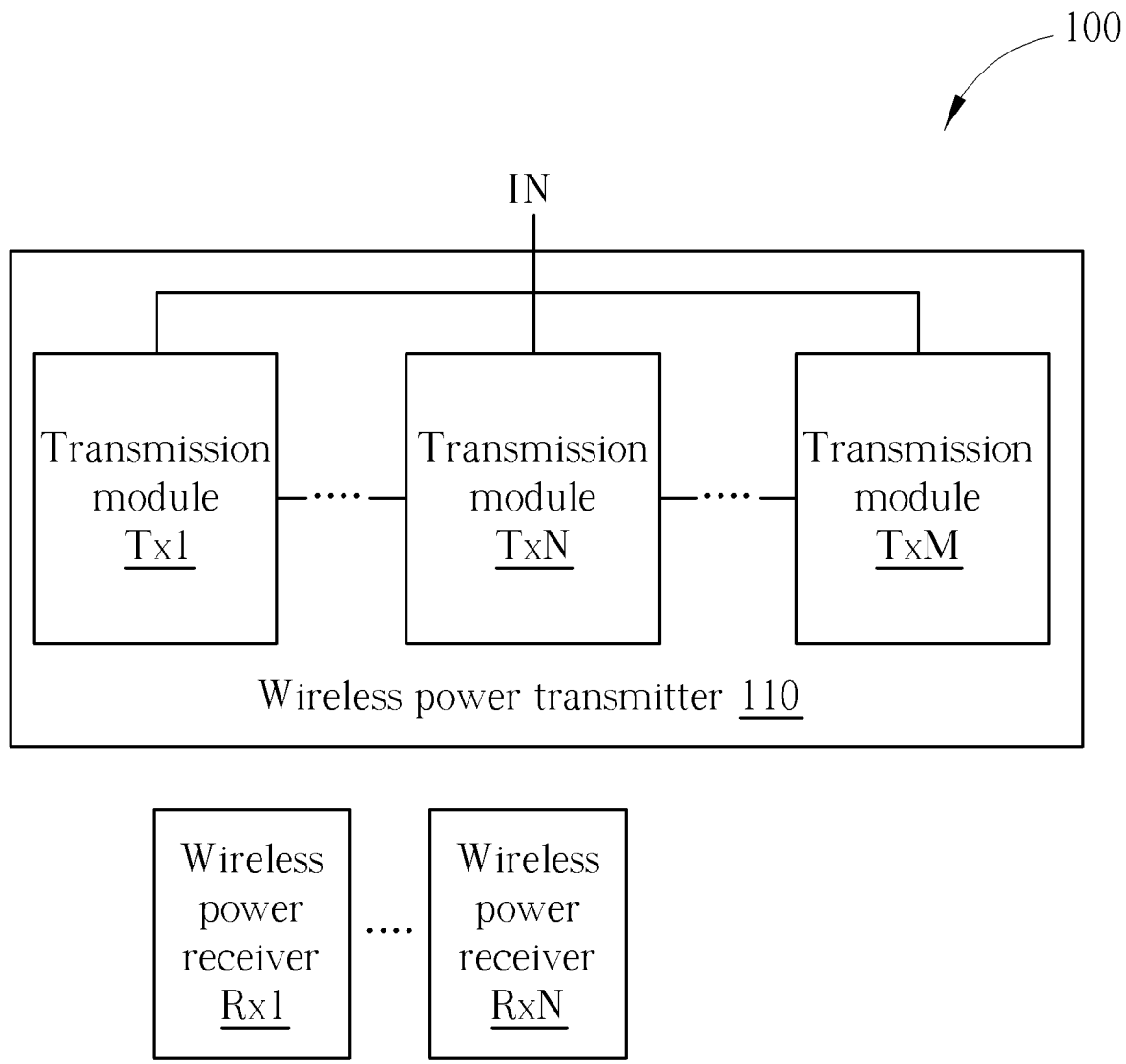
FIG. 1 is a diagram of a wireless charging system of an embodiment of the present invention.

FIG. 1 is a diagram of a wireless charging system 100 of an embodiment of the present invention. The wireless charging system 100 includes a wireless power transmitter 110 and N wireless power receivers Rx1~RxN. The wireless power transmitter 110 includes a power input terminal IN for receiving input power and M transmission modules Tx1~TxM. In an example, the wireless power transmitter 110 and the wireless power receiver Rx1 may be respectively a charger and an electrical device.

Figure 2:
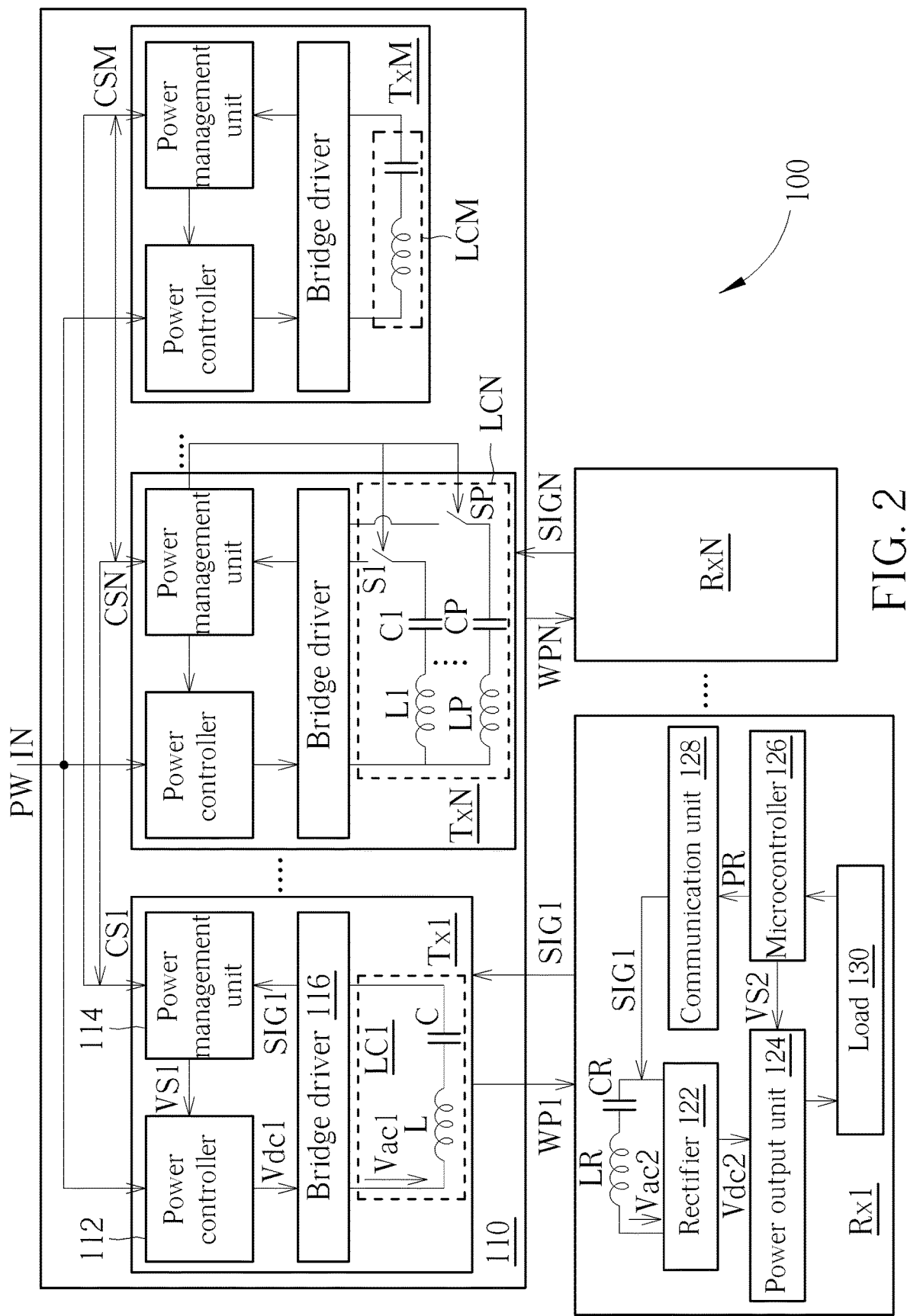
FIG. 2 is a diagram of a configuration of the wireless charging system of FIG. 1.

FIG. 2 is a diagram of a configuration of the wireless charging system 100 of FIG. 1. The transmission module Tx1 is elaborated as an example. The transmission module Tx1 includes a power controller 112, a power management unit (PMU) 114, a bridge driver 116 and a transmission unit LC1. The power management unit 114 is coupled to the power controller 112 for generating a first voltage control signal VS1 according to the N communication signals SIG1~SIGN. The power controller 112 is coupled to the power input terminal IN for converting the input power PW to a first DC signal Vdc1 according to the first voltage control signal VS1. The bridge driver 116 is coupled to the power controller 112 and the power management unit 114 for converting the first DC signal Vdc1 to the first AC signal Vac1 and transmitting the communication signal SIG1 to the power management unit 114. The transmission unit LC1 is coupled to the bridge driver 116 for wirelessly transmitting the wireless power signal WP1 according to the first AC signal Vac1, wirelessly receiving the communication signal SIG1, and transmitting the communication signal SIG1 to the bridge driver 116. The wireless power receiver Rx1 is for receiving the wireless power signal WP1 from the transmission unit LC1 of the transmission module Tx1 and the wirelessly transmitting the communication signal SIG1 to the transmission unit LC1 of the transmission module Tx1.

In other words, the N wireless power receivers Rx1~RxN are used to receive the N wireless power signals WP1~WPN from the corresponding N transmission modules Tx1~TxN, and wirelessly transmit the N communication signals SIG1~SIGN to the corresponding N transmission module Tx1~TxN. The power management units 114 of the transmission modules Tx1~TxM are coupled to each other and transmit a plurality of control signals CS1~CSM for handshaking communication. The number of transmission modules can be greater than or equal to the number of wireless power receivers (M≥N>1). If the transmitter module TxM does not detect the corresponding wireless power receiver, the transmitter module TxM would not receive the communication signal.

The communication signals SIG1~SIGN each include power requests of the wireless power receivers Rx1~RxN respectively. The power management units 114 of the transmission modules Tx1~TxM are coupled to each other and transmit a plurality of control signals CS1~CSM for handshaking communication. The power management units 114 set the transmission of the wireless power signals WP1~WPN of the modules Tx1~TxN by generating the first voltage control signal VS1. The first voltage control signals VS1 of the N transmission modules Tx1~TxN may be different, so that the transmission modules Tx1~TxN may output different wireless power signals WP1~WPN.

The control signals CS1~CSM may be Inter-Integrated Circuit signals (I2C), Universal Asynchronous Receiver/Transmitter signals (UART), Serial Peripheral Interface Bus signals (SPI) or General-purpose input/output signals (GPIO).

The bridge driver 116 may be a DC-AC converter such as an H-bridge. The power management unit 114 may include a microcontroller and a buck converter. However, the embodiment is not limited thereto.

The communication signal SIG1 can be transmitted in the same frequency channel as the wireless power signal WP1 through In-Band communication. Also, the communication signal SIG1 can be transmitted in a different frequency channel from the wireless power signal WP1 through Out-Band communication.

In other embodiments, the configuration of the transmission module TxN may be similar to that of the transmission module Tx1. The difference is that the transmission unit LCN may include P coils L1~LP, P capacitors C1~CP, and P switches S1~SP (P>1). Each coil is coupled in series with the corresponding capacitor and the corresponding switch. The switches S1~SP are coupled to the power management unit 114 of the transmission modules TxN for turning on one of the switches S1~SP and turning off the other switches according to the switch signal from the power management unit 114. In other words, the transmission unit LCN may include multiple coils and capacitors to increase the charging induction area.

The other transmission modules may be similar to the transmission modules Tx1~TxN, and is not repeated herein. However, the embodiment is not limited thereto. The configuration of the transmission modules Tx1~TxN may all be the same as the transmission module Tx1, or may all be the same as the transmission module TxN, or may be with various combinations.

The wireless power receiver Rx1 includes a coil LR, a capacitor CR coupled to the coil LR in series, a rectifier 122, a power output unit 124, a microcontroller 126, a communication unit 128 and a load 130. The coil LR is for wirelessly receiving and transmitting the wireless power signal WP1 from the transmission unit LC1 of the transmission module Tx1 and converting the wireless power signal WP1 to the second AC signal Vac2. It may also wirelessly transmit communication signal SIG1 to the transmission unit LC1 of the transmission module Tx1. The rectifier 122 is coupled to the coil LR and the capacitor CR for converting the second AC signal Vac2 to the second DC signal Vdc2. The power output unit 124 is coupled to the rectifier 122 for adjusting the second DC signal Vdc2 according to the second voltage control signal VS2 to generate a stable output power to the load 130. The microcontroller 126 is coupled to the load 130 and the power output unit 124 for generating the power request signal PR and the second voltage control signal VS2 according to the power capacity of the load 130. The communication unit 128 is coupled to the capacitor CR and the microcontroller 126 for outputting the communication signal SIG1 to the coil LR and the capacitor CR according to the power request signal PR. The power output unit 124 can reduce the voltage of the second DC signal Vdc2 through the second voltage control signal VS2 from the microcontroller 126 according to the power capacity of the load 130 to prevent the load 130 from being damaged due to excessive voltage.

The power output unit 124 may be a low dropout regulator, and the load 130 may be an electrical device or a rechargeable battery. In addition, the communication unit 128 may be communication circuits designed according to AirFuel Alliance or WPC (Wireless Power Consortium) standards. The other wireless power receivers may be the same as the wireless power receiver Rx1, and they may communicate with the other corresponding transmission modules.

Figure 3:
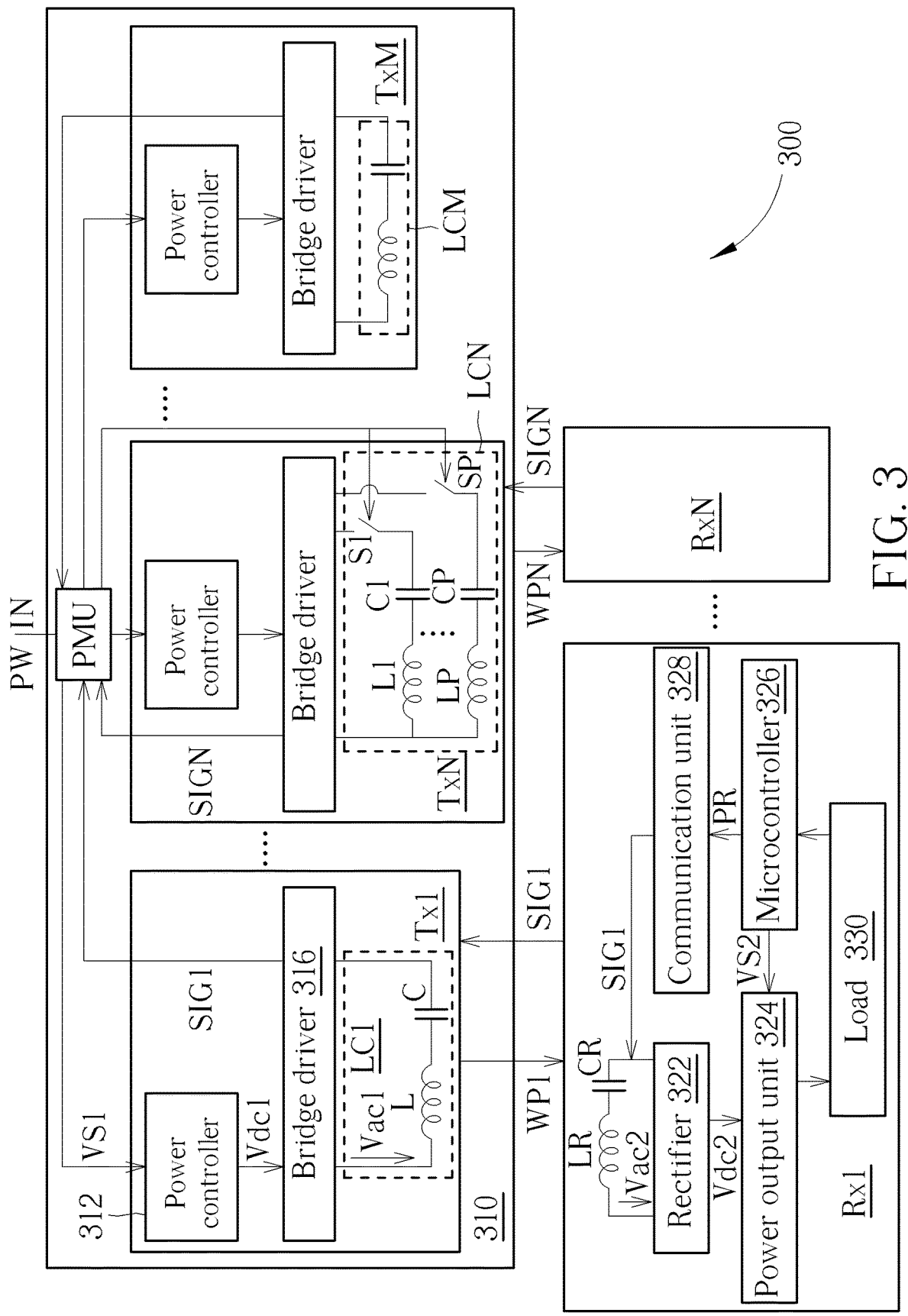
FIG. 3 is a diagram of a wireless charging system of an embodiment of the present invention.

FIG. 3 is a diagram of a wireless charging system 300 of an embodiment of the present invention. The wireless charging system 300 includes a wireless power transmitter 310 and N wireless power receivers Rx1~RxN. The wireless power transmitter 310 includes a power input terminal IN for receiving the input power PW, a power management unit PMU coupled to the power input terminal IN, and M transmission modules Tx1~TxM. The power management unit PMU is for generating N first voltage control signals VS1 according to the N communication signals SIG1~SIGN.

The transmission module Tx1 is elaborated as an example. The transmission module Tx1 includes a power controller 312, a bridge driver 316 and a transmission unit LC1. The power controller 312 is coupled to the power management unit PMU for converting the input power PW to the first DC signal Vdc1 according to the first voltage control signal VS1. The bridge driver 316 is coupled to the power controller 312 and the power management unit PMU for converting the first DC signal Vdc1 to the first AC signal Vac1 and transmitting the communication signal SIG1 to the power management unit PMU. The transmission unit LC1 is coupled to the bridge driver 316 for wirelessly transmitting the wireless power signal WP1 according to the first AC signal Vac1, wirelessly receiving the communication signal SIG1, and transmitting the communication signal SIG1 to the bridge driver 316. The wireless power receiver Rx1 is for receiving the corresponding wireless power signal WP1 and wirelessly transmitting the corresponding communication signal SIG1.

In other words, the N wireless power receivers Rx1~RxN are used to receive the N wireless power signals WP1~WPN from the corresponding N transmission modules Tx1~TxN, and wirelessly transmit the N communication signals SIG1~SIGN to the corresponding N transmission module Tx1~TxN. The number of transmission modules can be greater than or equal to the number of wireless power receivers (M≥N>1). If the transmitter module TxM does not detect the corresponding wireless power receiver, the transmitter module TxM would not receive the communication signal.

The communication signals SIG1~SIGN each include power requests of the wireless power receivers Rx1~RxN respectively. The power management unit PMU may set the transmission of the wireless power signals WP1~WPN of the transmission modules Tx1~TxN by generating N first voltage control signal VS1. The N first voltage control signals VS1 of the N transmission modules Tx1~TxN may be different, so that the transmission modules Tx1~TxN may output different wireless power signals WP1~WPN.

The bridge driver 316 may be a DC-AC converter such as an H-bridge. The power management unit PMU may include a microcontroller and a buck converter. However, the embodiment is not limited thereto.

The communication signal SIG1 can be transmitted in the same frequency channel as the wireless power signal WP1 through In-Band communication. Also, the communication signal SIG1 can be transmitted in a different frequency channel from the wireless power signal WP1 through Out-Band communication.

The transmission units LC1~LCM of the wireless charging system 300 may be similar to the transmission units LC1~LCM of the wireless charging system 100. Also, the wireless power receivers Rx1~RxN of the wireless charging system 300 may be similar to the wireless power receivers Rx1~RxN of the wireless charging system 100. The description is not repeated herein.

Figure 4:
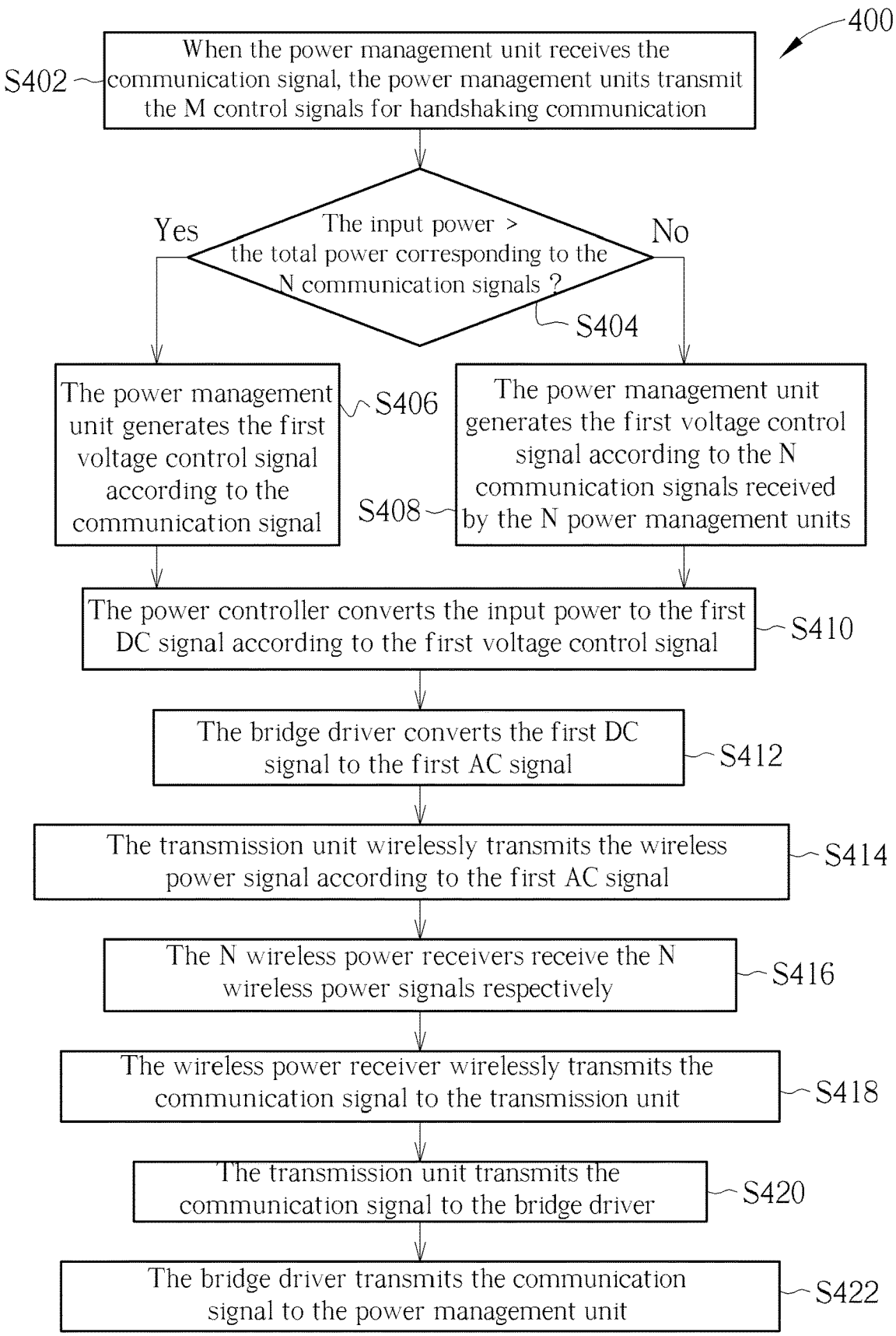
FIG. 4 is a flowchart of an operating method for the wireless charging system of FIG. 2.

FIG. 4 is a flowchart of an operating method 400 for the wireless charging system 100 of FIG. 2. Taking the transmitting module Tx1 and the wireless power receiver Rx1 as an example, the method 400 includes the following steps:

S402: When the power management unit 114 of the transmitter module Tx1 receives the communication signal SIG1, the M power management units 114 of the M transmitter modules Tx1~TxM transmit the M control signals CS1~CSM for handshaking communication;

S404: Is the input power PW greater than the total power corresponding to the N communication signals SIG1 to SIGN? If yes, proceed to step S406; otherwise proceed to step S408;

S406: The power management unit 114 of the transmission module Tx1 generates the first voltage control signal VS1 according to the communication signal SIG1, and skips to step S410;

S408: The power management unit 114 of the transmission module Tx1 generates the first voltage control signal VS1 according to the N communication signals SIG1~SIGN received by the N power management units 114 of the N transmitting modules Tx1~TxM;

S410: The power controller 112 converts the input power PW to the first DC signal Vdc1 according to the first voltage control signal VS1;

S412: The bridge driver 116 converts the first DC signal Vdc1 to the first AC signal Vac1;

S414: The transmission unit LC1 wirelessly transmits the wireless power signal WP1 according to the first AC signal Vac1;

S416: The N wireless power receivers Rx1~RxN receive the N wireless power signals WP1~WPN respectively from the N transmission units LC1~LCN of the N transmission modules Tx1~TxN;

S418: The wireless power receiver Rx1 wirelessly transmits the communication signal SIG1 to the transmission unit LC1;

S420: The transmission unit LC1 transmits the communication signal SIG1 to the bridge driver 116; and S422: The bridge driver 116 transmits the communication signal SIG1 to the power management unit 114.

In steps S402 and S404, the power management unit 114 determines whether there is a wireless power receiver added or removed according to the control signals CS1~CSM. Furthermore, it determines whether the input power PW is less than the total power requested by all the wireless power receivers Rx1~RxN (that is, the total power corresponding to the N communication signals SIG1~SIGN). The power management unit 114 of the transmission module Tx1 performs handshaking communication with other power management units 114 via the control signals CS1~CSM to set the first voltage control signal VS1 of the transmission module Tx1. When the input power PW is less than the total power requested by all the wireless power receivers Rx1~RxN, in order to avoid system failure caused by excessive power requests, the power management units 114 of the N transmission modules Tx1~TxN sets the first voltage control signals VS1 of the transmission modules Tx1~TxN so that the total power of the wireless power signals WP1~WPN is less than the total power requested by the wireless power receivers Rx1~RxN. The transmission modules Tx1~TxN store the first voltage control signals VS1 in the memories of the power management units 114, and output wireless power signals WP1~WPN to wireless power receivers Rx1~RxN according to the first voltage control signals VS1. The memories may be solid state memories such as electrically erasable programmable read-only memories (EEPROM) or flash memories.

In addition, the power management units 114 of the N transmission modules Tx1~TxN can set the transmission modules Tx1~TxN to output the wireless power signals WP1~WPN using a preset power allocation table. In an example the wireless charging system 100 includes two wireless power receivers (such as mobile phones), and the input power PW of the wireless charging system 100 is 24 W. When each wireless power receiver requests 10 W of power, the input power PW is greater than the total requested power (24 W>20 W). The power management unit 114 can allocate 10 W of wireless power signal to each wireless power receiver. When each wireless power receiver requests 15 W of power, the input power PW is less than the total requested power (24 W<30 W). The power management unit 114 can set the wireless power signal of each transmission module according to the preset power allocation table, such as 15 W of wireless power signal to one wireless power receiver, 8 W of wireless power signal to another wireless power receiver. In another embodiment, it can set 10 W of wireless power signal to both wireless power receivers. It may allocate different or the same wireless power signal to the wireless power receivers as appropriate. The power management unit 114 may also allocate the wireless power signals using other methods. The embodiment is not limited thereto.

The operating method of the other transmission modules and their corresponding wireless power receivers is similar to the operating method 400, and is not repeated herein.

Figure 5:
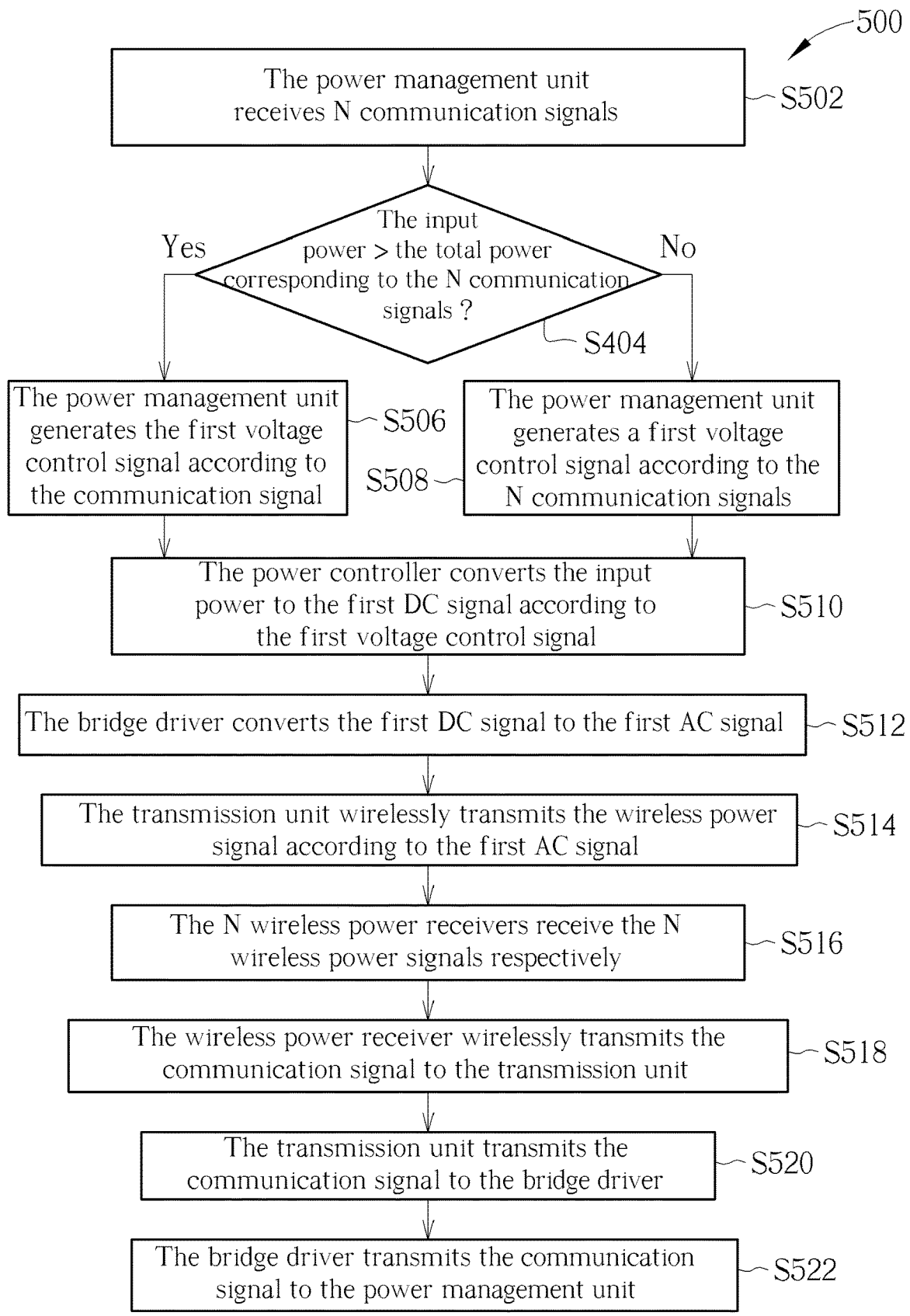
FIG. 5 is a flowchart of an operating method for the wireless charging system of FIG. 3.

FIG. 5 is a flowchart of an operating method 500 for the wireless charging system 300 of FIG. 3. Taking the transmitting module Tx1 and the wireless power receiver Rx1 as an example, the method 500 includes the following steps:

S502: The power management unit PMU receives N communication signals SIG1~SIGN;

S504: Is the input power PW greater than the total power corresponding to the N communication signals SIG1~SIGN? If yes, proceed to step S506; otherwise proceed to step S508;

S506: The power management unit PMU generates the first voltage control signal VS1 according to the communication signal SIG', and skips to step S510;

S508: The power management unit PMU generates a first voltage control signal VS1 according to the N communication signals SIG1~SIGN;

S510: The power controller 312 converts the input power PW to the first DC signal Vdc1 according to the first voltage control signal VS1;

S512: The bridge driver 316 converts the first DC signal Vdc1 to the first AC signal Vac1;

S514: The transmission unit LC1 wirelessly transmits the wireless power signal WP1 according to the first AC signal Vac1;

S516: The N wireless power receivers Rx1~RxN receive the N wireless power signals WP1~WPN respectively from the N transmission units LC1~LCN of the N transmission modules Tx1~TxN;

S518: The wireless power receiver Rx1 wirelessly transmits the communication signal SIG1 to the transmission unit LC1;

S520: The transmission unit LC1 transmits the communication signal SIG1 to the bridge driver 316; and S522: The bridge driver 316 transmits the communication signal SIG1 to the power management unit PMU.

In steps S502 and S504, the power management unit PMU determines whether there is a wireless power receiver added or removed according to the communication signals SIG1~SIGN. Furthermore, it determines whether the input power PW is less than the total power requested by all the wireless power receivers Rx1~RxN (that is, the total power corresponding to the N communication signals SIG1~SIGN). When the input power PW is less than the total power requested by all the wireless power receivers Rx1~RxN, in order to avoid system failure caused by excessive power requests, the power management units PMU sets the first voltage control signals VS1 of the N transmission modules Tx1~TxN so that the total power of the wireless power signals WP1~WPN is less than the total power requested by the wireless power receivers Rx1~RxN. The first voltage control signals VS1 may be stored in the memory of the power management unit PMU. The transmission modules Tx1~TxN may output wireless power signals WP1~WPN to wireless power receivers Rx1~RxN according to the first voltage control signals VS1. The memory may be solid state memory such as electrically erasable programmable read-only memory (EEPROM) or flash memory.

Similar to the operating method 400, the power management unit PMU may use a preset power allocation table or other methods to set the output power of each transmission module. The description is not repeated herein.

Figure 6:
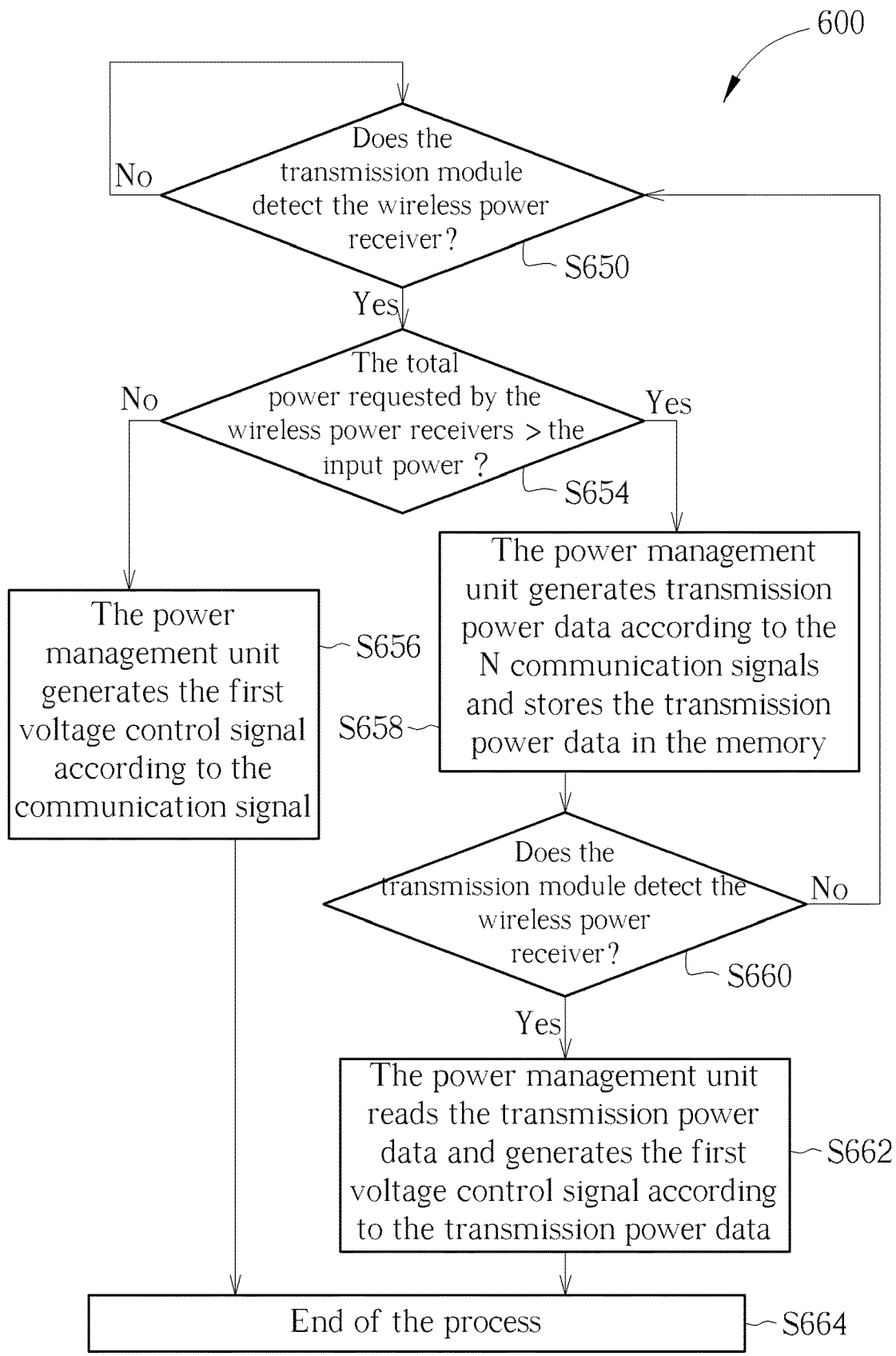
FIG. 6 is a flowchart of a method for generating the first voltage control signals in the operating method of FIG. 4.

FIG. 6 is a flowchart of a method 600 for generating the first voltage control signals VS1 in the operating method 400 of FIG. 4. It includes the following steps:

S650: Perform the initial operation; does the transmission module Tx1 detect the wireless power receiver Rx1? If yes, proceed to step S654; otherwise, repeat step S650;

S654: The M power management units 114 of the M transmission modules Tx1~TxM transmit M control signals CS1 to CSM for handshaking communication to determine whether the total power requested by the wireless power receivers Rx1~RxN is greater than the input power PW? If yes, proceed to step S658, otherwise proceed to step S656;

S656: The power management unit 114 of the transmission module Tx1 generates the first voltage control signal VS1 according to the communication signal SIG1, and skips to step S664;

S658: The power management unit 114 of the transmission module Tx1 generates transmission power data according to the N communication signals SIG1~SIGN, and stores the transmission power data in the memory of the power management unit 114;

S660: Back to the initial operation, does the transmission module Tx1 detect the wireless power receiver Rx1? If yes, proceed to step S662; otherwise, go back to step S650;

S662: The power management unit 114 of the transmission module Tx1 reads the transmission power data, and generates the first voltage control signal VS1 according to the transmission power data; and S664: End the process of generating the first voltage control signal.

When one of the wireless power receivers Rx1~RxN is added or removed, the power management unit 114 can again determine the total power requested by the wireless power receivers Rx1~RxN according to the control signals CS1~CSN, and generate the appropriate first voltage control signal VS1.

Figure 7:
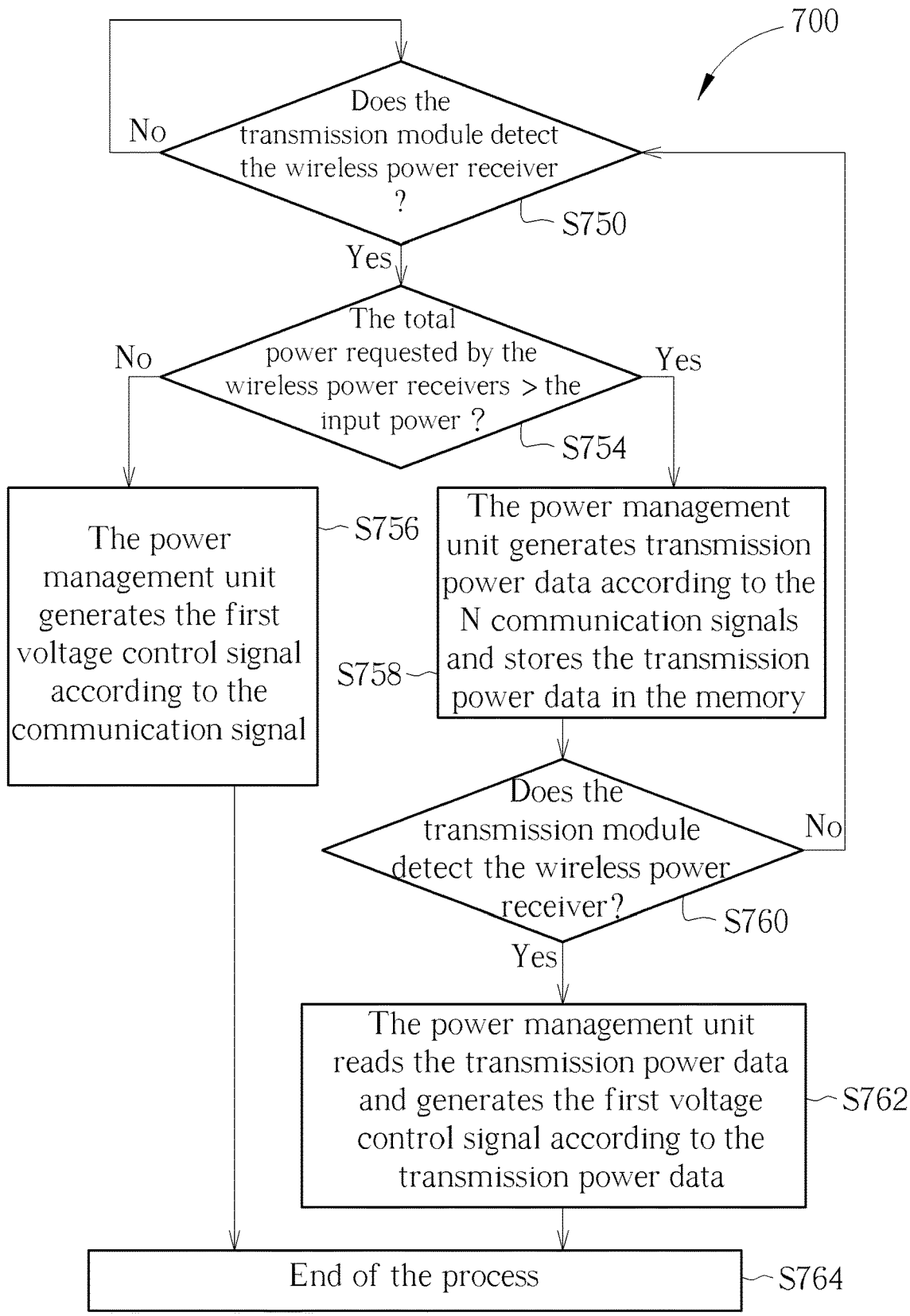
FIG. 7 is a flowchart of a method for generating the first voltage control signals VS1 in the operating method of FIG. 5.

FIG. 7 is a flowchart of a method 700 for generating the first voltage control signals VS1 in the operating method 500 of FIG. 5. It includes the following steps:

S750: Perform the initial operation; does the transmission module Tx1 detect the wireless power receiver Rx1? If yes, proceed to step S754; otherwise, repeat step S750;

S754: The power management unit PMU accesses the communication signals SIG1~SIGN to determine whether the total power requested by the wireless power receivers Rx1~RxN is greater than the input power PW? If yes, proceed to step S758, otherwise proceed to step S756;

S756: The power management unit PMU generates the first voltage control signal VS1 according to the communication signal SIG', and skips to step S764;

S758: The power management unit PMU generates transmission power data according to the N communication signals SIG1~SIGN, and stores the transmission power data in the memory of the power management unit PMU;

S760: Back to the initial operation, does the transmission module Tx1 detect the wireless power receiver Rx1? If yes, proceed to step S762; otherwise, go back to step S750;

S762: The power management unit PMU reads the transmission power data, and generates the first voltage control signal VS1 according to the transmission power data; and S764: End the process of generating the first voltage control signal.

When one of the wireless power receivers Rx1~RxN is added or removed, the power management unit PMU can again determine the total power requested by the wireless power receivers Rx1~RxN according to the communication signals SIG1~SIGN, and generate the appropriate first voltage control signal VS1.

In summary, the wireless charging system and its operating method according to the embodiments of the present invention can transmit a plurality of wireless power signals to a plurality of corresponding wireless power receivers from one wireless power transmitter. In addition, it can adopt handshaking communication between the power management units for rapid distribution of the wireless power signal to each wireless power receiver. It can prevent the wireless power transmitter from malfunctioning due to excessive power requests, and can optimize the charging efficiency, so that each wireless power receiver can have a stable charging process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless charging system, comprising:
    a wireless power transmitter, comprising:
        a power input terminal configured to receive an input power; and
        M transmission modules, each transmission module comprising:
            a power controller coupled to the power input terminal, configured to convert the input power to a first DC (direct-current) signal according to a first voltage control signal;
            a power management unit (PMU) coupled to the power controller, configured to generate the first voltage control signal according to N communication signals;
            a bridge driver coupled to the power controller and the power management unit, configured to convert the first DC signal to a first AC (alternating-current) signal and to transmit a communication signal to the power management unit; and
            a transmission unit coupled to the bridge driver, configured to wirelessly transmit a wireless power signal according to the first AC signal, wirelessly receive the communication signal, and transmit the communication signal to the bridge driver; and
    N wireless power receivers configured to receive N wireless power signals from N transmission units of N transmission modules respectively, and wirelessly transmit the N communication signals to the N transmission units of the N transmission modules respectively;
    wherein the M power management units of the M transmission modules are coupled to each other and transmit control signals for handshaking communication, and M≥N>1.

2. The wireless charging system of claim 1, wherein the control signals are Inter-Integrated Circuit signals (I2C), Universal Asynchronous Receiver/Transmitter signals (UART), Serial Peripheral Interface Bus signals (SPI) or General-purpose input/output signals (GPIO).

3. The wireless charging system of claim 1, wherein the transmission unit of the each transmission module comprises:

a coil coupled to the bridge driver, configured to wirelessly transmit the wireless power signal and wirelessly receive the communication signal; and a capacitor coupled to the bridge driver and the coil in series.

4. The wireless charging system of claim 1, wherein the transmission unit of the each transmission module comprises:

P coils;
P capacitors; and
P switches;
each coil is coupled in series to a corresponding capacitor and a corresponding switch;
each switch is coupled to the power management unit;
one of the P switches is turned on and the other P−1 switches are turned off according to a switch signal from the power management unit; and
P>1.

5. The wireless charging system of claim 1, wherein each wireless power receiver comprises:

a coil configured to wirelessly receive a wireless power signal from a transmission unit of a corresponding transmission module, convert the wireless power signal to a second AC signal, and wirelessly transmit the communication signal to the transmission unit of the corresponding transmission module;
a capacitor coupled to the coil in series;
a rectifier coupled to the coil and the capacitor, configured to convert the second AC signal to a second DC signal;
a power output unit, coupled to the rectifier, configured to adjust the second DC signal according to a second voltage control signal to generate an output voltage to a load;
a microcontroller coupled to the load and the power output unit, configured to generate a power request signal and the second voltage control signal according to a power of the load; and
a communication unit coupled to the capacitor and the microcontroller, configured to output the communication signal to the coil and the capacitor according to the power request signal.

6. A wireless charging system, comprising:
a wireless power transmitter, comprising:
a power input terminal configured to receive an input power;
a power management unit coupled to the power input terminal, configured to generate N first voltage control signals according to the N communication signals; and
M transmission modules, each transmission module comprising:
a power controller coupled to the power management unit, configured to convert the input power to a first DC (direct-current) signal according to a first voltage control signal of the N first voltage control signals;
a bridge driver coupled to the power controller, configured to convert the first DC signal to a first AC (alternating-current) signal and to transmit one of the N communication signals to the power management unit; and
a transmission unit coupled to the bridge driver, configured to wirelessly transmit a wireless power signal according to the first AC signal, wirelessly receive the communication signal, and transmit the communication signal to the bridge driver; and N wireless power receivers configured to receive N wireless power signals from N transmission units of N transmission modules respectively, and wirelessly transmit the N communication signals to the N transmission units of the N transmission modules respectively;
wherein M≥N>1.

7. The wireless charging system of claim 6, wherein the transmission unit of the each transmission module comprises:

a coil coupled to the bridge driver, configured to wirelessly transmit the wireless power signal and wirelessly receive the communication signal; and
a capacitor coupled to the bridge driver and the coil in series.

8. The wireless charging system of claim 6, wherein the transmission unit of the each transmission module comprises:

P coils;
P capacitors; and
P switches;
each coil is coupled in series to a corresponding capacitor and a corresponding switch;
each switch is coupled to the power management unit;
one of the P switches is turned on and the other P-1 switches are turned off according to a switch signal from the power management unit; and
P>1.

9. The wireless charging system of claim 6, wherein each wireless power receiver comprises:

a coil configured to wirelessly receive a wireless power signal from a transmission unit of a corresponding transmission module, convert the wireless power signal to a second AC signal, and wirelessly transmit the communication signal to the transmission unit of the corresponding transmission module;
a capacitor coupled to the coil in series;
a rectifier coupled to the coil and the capacitor, configured to convert the second AC signal to a second DC signal;
a power output unit, coupled to the rectifier, configured to adjust the second DC signal according to a second voltage control signal to generate an output voltage to a load;
a microcontroller coupled to the load and the power output unit, configured to generate a power request signal and the second voltage control signal according to a power of the load; and
a communication unit coupled to the capacitor and the microcontroller, configured to output the communication signal to the coil and the capacitor according to the power request signal.

10. An operating method for a wireless charging system, the wireless charging system comprising a wireless power transmitter and N wireless power receivers, the wireless power transmitter comprising a power input terminal and M transmission modules, each transmission module comprising a power controller, a power management unit, a bridge driver, and a transmission unit, the method comprising:

when the power management unit receives a communication signal, M power management units of the M transmission modules transmitting M control signals for handshaking communication;
the power management unit generating a first voltage control signal according to the communication signal;
the power controller converting an input power to a first DC signal according to the first voltage control signal;

the bridge driver converting the first DC signal to a first AC signal;

the transmission unit wirelessly transmitting a wireless power signal according to the first AC signal; and the N wireless power receivers respectively receiving N wireless power signals from N transmission units of N transmission modules;

wherein M≥N>1.

11. The method of claim 10, wherein the M control signals are Inter-Integrated Circuit signals (I2C), Universal Asynchronous Receiver/Transmitter signals (UART), Serial Peripheral Interface Bus signals (SPI) or General-purpose input/output signals (GPIO).

12. The method of claim 10 further comprising:

one of the N wireless power receivers wirelessly transmitting the communication signal to the transmission unit;

the transmission unit transmitting the communication signal to the bridge driver; and the bridge driver transmitting the communication signal to the power management unit.

13. The method of claim 10, wherein the transmission unit comprises P coils, P capacitors, and P switches, each coil is coupled in series to a corresponding capacitor and a corresponding switch, and each switch is coupled to the power management unit, the method further comprising:

turning on one of the P switches, and turning off P-1 switches of the P switches according to a switch signal from the power management unit;

wherein P>1.

14. An operating method for a wireless charging system, the wireless charging system comprising a wireless power transmitter and N wireless power receivers, the wireless power transmitter comprising a power input terminal, a power management unit, and M transmission modules, each transmission module comprising a power controller, a bridge driver, and a transmission unit, the method comprising:

when the power management unit receives a communication signal, the power management unit generating a first voltage control signal according to the communication signal;

the power controller converting an input power to a first DC signal according to the first voltage control signal;

the bridge driver converting the first DC signal to a first AC signal;

the transmission unit wirelessly transmitting a wireless power signal according to the first AC signal; and the N wireless power receivers respectively receiving N wireless power signals from N transmission units of N transmission modules;

wherein M≥N>1.

15. The method of claim 14 further comprising:

one of the N wireless power receivers wirelessly transmitting the communication signal to the transmission unit;

the transmission unit transmitting the communication signal to the bridge driver; and the bridge driver transmitting the communication signal to the power management unit.

16. The method of claim 14, wherein the transmission unit comprises P coils, P capacitors, and P switches, each coil is coupled in series to a corresponding capacitor and a corresponding switch, and each switch is coupled to the power management unit, the method further comprising:

turning on one of the P switches, and turning off P-1 switches of the P switches according to a switch signal from the power management unit;

wherein P>1.

\* \* \* \* \*